(12) United States Patent
Nelson

(10) Patent No.: US 8,682,884 B2
(45) Date of Patent: Mar. 25, 2014

(54) SYSTEM FOR COMBINING DATASETS AND INFORMATION STRUCTURES BY INTERCALATION

(76) Inventor: Theodor Holm Nelson, Long Valley, NJ (US)

( * ) Notice: Subject to any disclaimer, the term of this patent is extended or adjusted under 35 U.S.C. 154(b) by 0 days.

(21) Appl. No.: 13/538,785

(22) Filed: Jun. 29, 2012

(65) Prior Publication Data

US 2013/0174003 A1    Jul. 4, 2013

Related U.S. Application Data

(63) Continuation-in-part of application No. 10/906,651, filed on Feb. 28, 2005, now abandoned.

(60) Provisional application No. 60/521,156, filed on Feb. 29, 2004.

(51) Int. Cl.
*G06F 7/00*     (2006.01)

(52) U.S. Cl.
USPC ........................................................ 707/708

(58) Field of Classification Search
USPC ........................................................ 707/708
See application file for complete search history.

(56) References Cited

U.S. PATENT DOCUMENTS 6,262,736 B1 *   7/2001   Nelson .......................... 715/854

OTHER PUBLICATIONS

"What's on My Mind", by: Theodore Holm Nelson, Published 1998; http://www.xanadu.com/au/ted/zigzag/xybrap.html.*
"ZZ Cell Programming", by: Theodore Holm Nelson, Publisjed 1999; http://www.xanadu.com/zigzag/fw99/ZZCellProg.html.*

* cited by examiner

*Primary Examiner* — Cam-Linh Nguyen
*Assistant Examiner* — Chelcie Daye
(74) *Attorney, Agent, or Firm* — Intellectual Property Venture Group; Raymond E. Roberts

(57) ABSTRACT

A system for working with data in datasets or information structures, wherein at least some of the data has latent preferences for connection with the data in other datasets or information structures. The data for each of the datasets or information structures is stored into a slice of separable cells having actual connections forming independent relational orderings in one or more dimensions. The cells in each slice are then examined for the latent preferences and the cells having data seeking connection is identified as choosing cells and the cells sought to be connected to are identified as target cells. A latent connection is then added to either the choosing cell or the target cell for each of the latent preferences, thus preparing the slices for potential expression into one or more conglomerate structures.

26 Claims, 16 Drawing Sheets

| |
|---|
| Sunday |
| Monday |
| Tuesday |
| Wednesday |
| Thursday |
| Friday |
| Saturday |

TBL. 1a

| | |
|---|---|
| Catch dog | Muzzle dog |
| Wash dog | Inspect for tics |
| Dry dog | Apply flea reppellent |
| Comb dog | Remove muzzle |

TBL. 1b

| Key | Value |
|---|---|
| 73 | George |
| 2001 | Washington |
| 73+d.17 | 2001 |
| 2001-d.17 | 73 |

TBL. 2a

| Key | Value |
|---|---|
| 73 | 2001 \| slice 23 |

TBL. 2b

| Key | Value |
|---|---|
| 7900 | GO TO 2001 \| slice 23 |

TBL. 2c

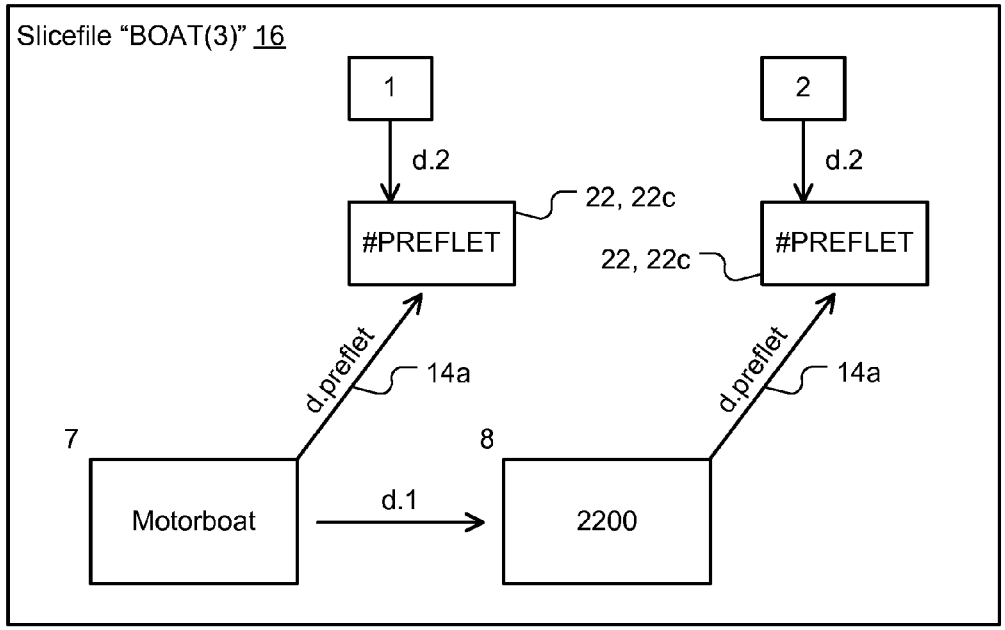
Note that these cells choose the same target cells at slicefile "car," because they were carved from the same context of cells.
FIG. 11
FIG. 12
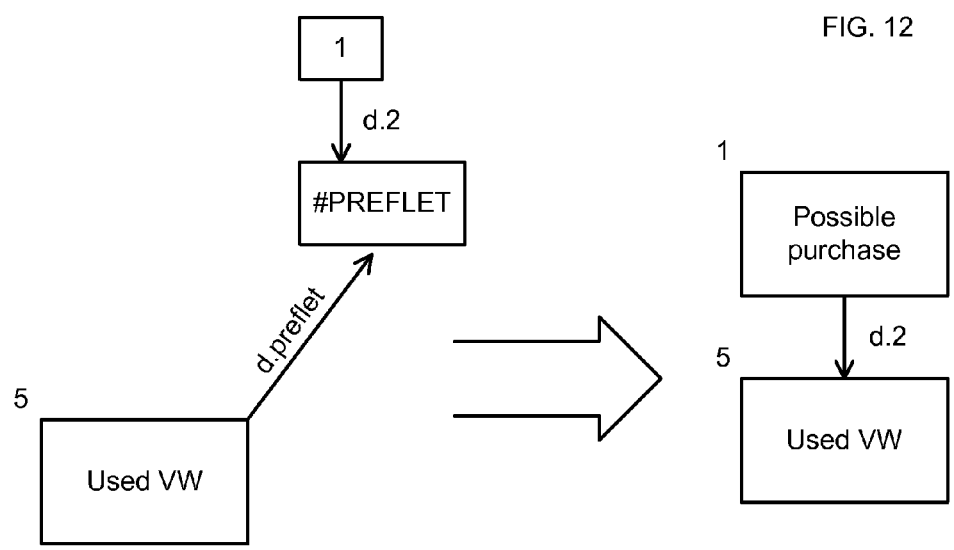

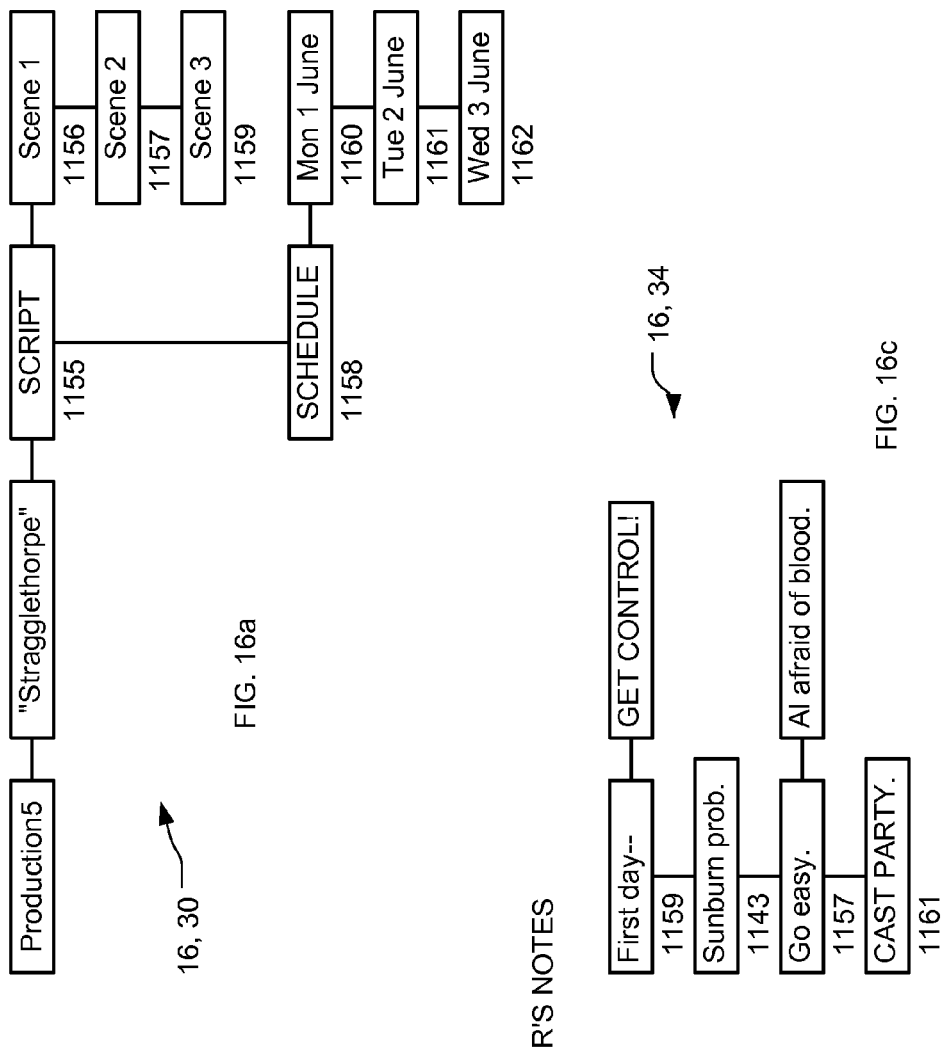

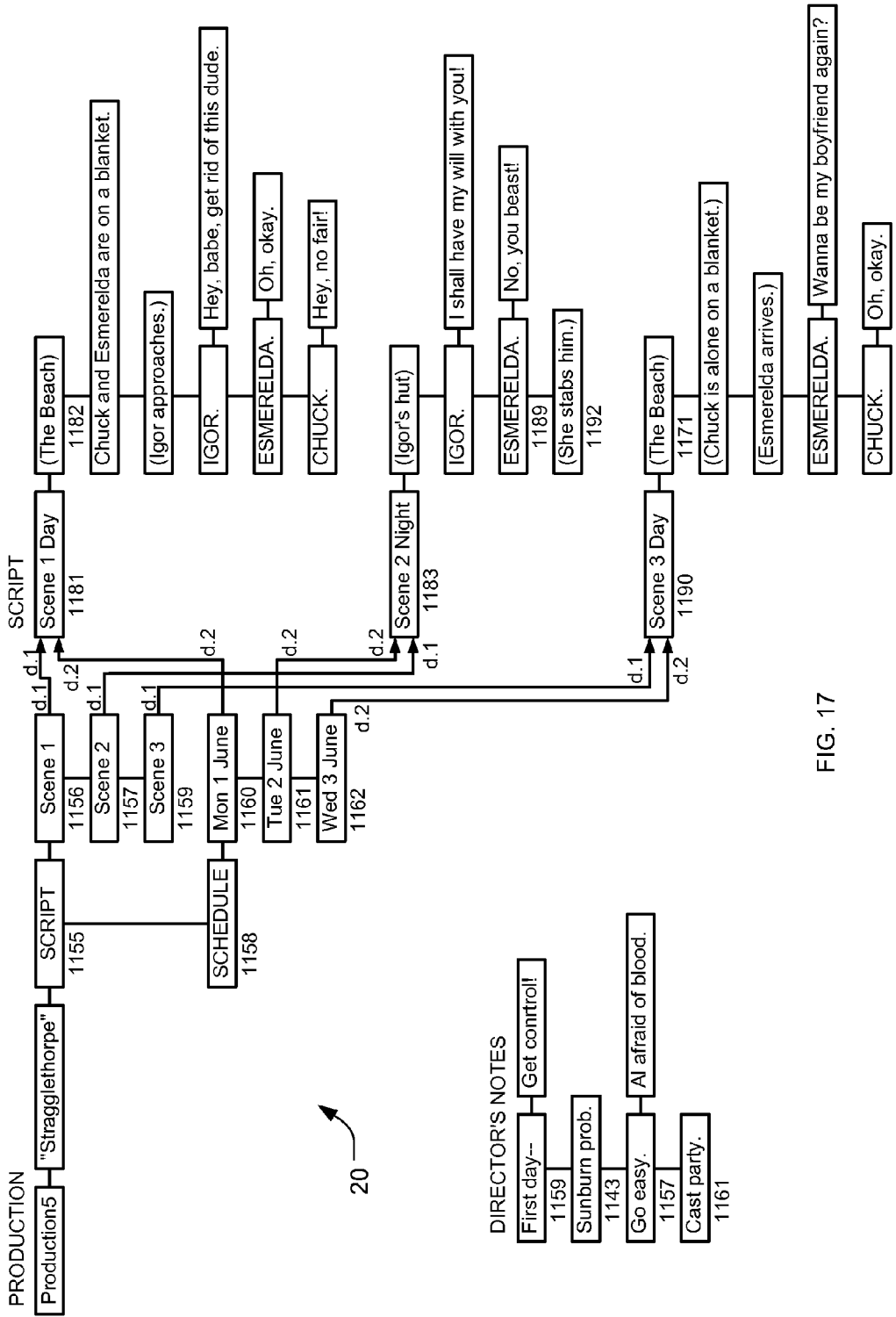

SYSTEM FOR COMBINING DATASETS AND INFORMATION STRUCTURES BY INTERCALATION

CROSS-REFERENCE TO RELATED APPLICATIONS

This is a continuation-in-part of application Ser. No. 10/906,651, filed Feb. 28, 2005, which claims the benefit of U.S. Provisional Application No. 60/521,156, filed Feb. 29, 2004, both hereby incorporated by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

COPYRIGHT NOTICE AND PERMISSION

This document contains some material which is subject to copyright protection. The copyright owner has no objection to the reproduction with proper attribution of authorship and ownership and without alteration by anyone of this material as it appears in the files or records of the Patent and Trademark Office, but otherwise reserves all rights whatsoever.

TECHNICAL FIELD

The present invention relates generally to data processing, and more particularly to an operator interface with which a user can interact with linked node groupings to navigate within a structure by following the links from one node to another.

BACKGROUND ART

Different approaches are used in the computer world to combine packages of data. For example, in the popular tool of relational databases, programmers may combine data by connecting separate tables. For example, in the popular mechanism of the spreadsheet, data or information structures are often combined by references from one spreadsheet to another. This makes it difficult for programs to work on the unified conglomerate of data. As a result, these approaches are both too difficult for many beginning and mid-level users.

Throughout the computer field, people need to combine data and information structures from different sources for aggregated use. Without limitation, it is desirable to have such structures able to add detail in virtually any amount; able to cope with contradictions among datasets; able to consider the consequences of alternative structures; able to bring additional detail into stored information; able to allow varying structures of connections, as wanted in different contexts; able to allow incompatible alternatives to be stored as separate packages of connected cells; able to hide information which is deeply connected to other information; and able to present and analyze the same data in different sequences and structures by adding new connections and annotations.

The present invention builds on the teachings of U.S. Pat. No. 6,262,736 by the present inventor, Theodor Holm Nelson (hereinafter the prior invention and hereby incorporated by reference in its entirety). This prior invention is a hyperspace constructed of cells having paired connectors that define dimensions. Complex tissues of the cells in linear and cyclical ranks can be navigated and manipulated by use of a stepper and various view rasters. The types of cells may include text cells, audio cells, video cells, and executable cells. By the use of clone cells and a clone dimension, the cells may be duplicated or referenced by transclusion. This has been implemented in computer software that is commonly now referred to as the ZigZag system. As such, the existing ZigZag system went a long way towards providing the desirable features noted above, but it does not provide all of those features and it does not provide features for extending to very large systems of linked data, or different variations of data.

BRIEF SUMMARY OF THE INVENTION

Accordingly, it is an object of the present invention to provide a system for combining datasets and information structures by intercalation.

Briefly, a preferred embodiment of the present invention is a method for working with data in datasets or information structures, wherein at least some of the data has latent preferences for connection with the data in other datasets or information structures. The data for each of the datasets or information structures is stored into a slice of separable cells having actual connections forming independent relational orderings in one or more dimensions. The cells in each slice are then examined for the latent preferences and the cells having data seeking connection is identified as choosing cells and the cells sought to be connected to are identified as target cells. A latent connection is then added to either the choosing cell or the target cell for each of the latent preferences, thus preparing the slices for potential expression into one or more conglomerate structures.

An advantage of the present invention is that it provides a system, which may be embodied into apparatus, methods, or computer programs to combine and de-combine datasets or information structures from different sources into an aggregated, conglomerate structure and then de-combine them again.

Another advantage of the inventive system is that it is able, all or in part as a matter of design choice, to add detail in virtually any amount; to cope with contradictions among datasets; to depict the consequences of alternative structures; to bring additional detail into stored information; to allow varying structures of connections, as wanted in different contexts; to allow incompatible alternatives to be stored as separate packages of connected cells; to hide information which is deeply connected to other information; and to present and analyze the same data in different sequences and structures by adding new connections and annotations.

And another advantage of the invention is that it can optionally be implemented in a manner consistent with widely held views in programming about what is legitimate, complete and well-connected by itself. As such, embodiments of the invention in accord with these principles can be expected to be easier to implement, fix, change later, remember, and document.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended tables and figures of drawings in which:

TBLS. 1a-b list example contents for the respective cells in FIGS. 1a-b, described below.

TBLS. 2a-c list example hash table contents for the respective connection mechanisms in FIGS. 2a-c, described below.

FIGS. 1a-b are schematics depicting basic elements of an exemplary embodiment of the present inventive system, wherein FIG. 1a shows a before case and FIG. 1b shows an after case of datasets and information structures combined by intercalation.

FIGS. 2a-c are schematics stylistically depicting some example latent connection mechanisms in accord with the present invention, wherein FIG. 2a shows a full-link approach, FIG. 2b shows a half-link approach, and FIG. 2c shows a "marshmallow" approach.

FIG. 5 is a block diagram showing a primitive or template slice that a user begins with to create a slicefile ("MAIN(1)").

FIG. 11 is a block diagram showing how the preflet mechanism of the system makes note of the latent connections created by carving operation.

FIG. 12 is a block diagram showing a resolving operation when slicefile CAR(2) is brought into memory with slicefile MAIN(1).

Figure 16B:
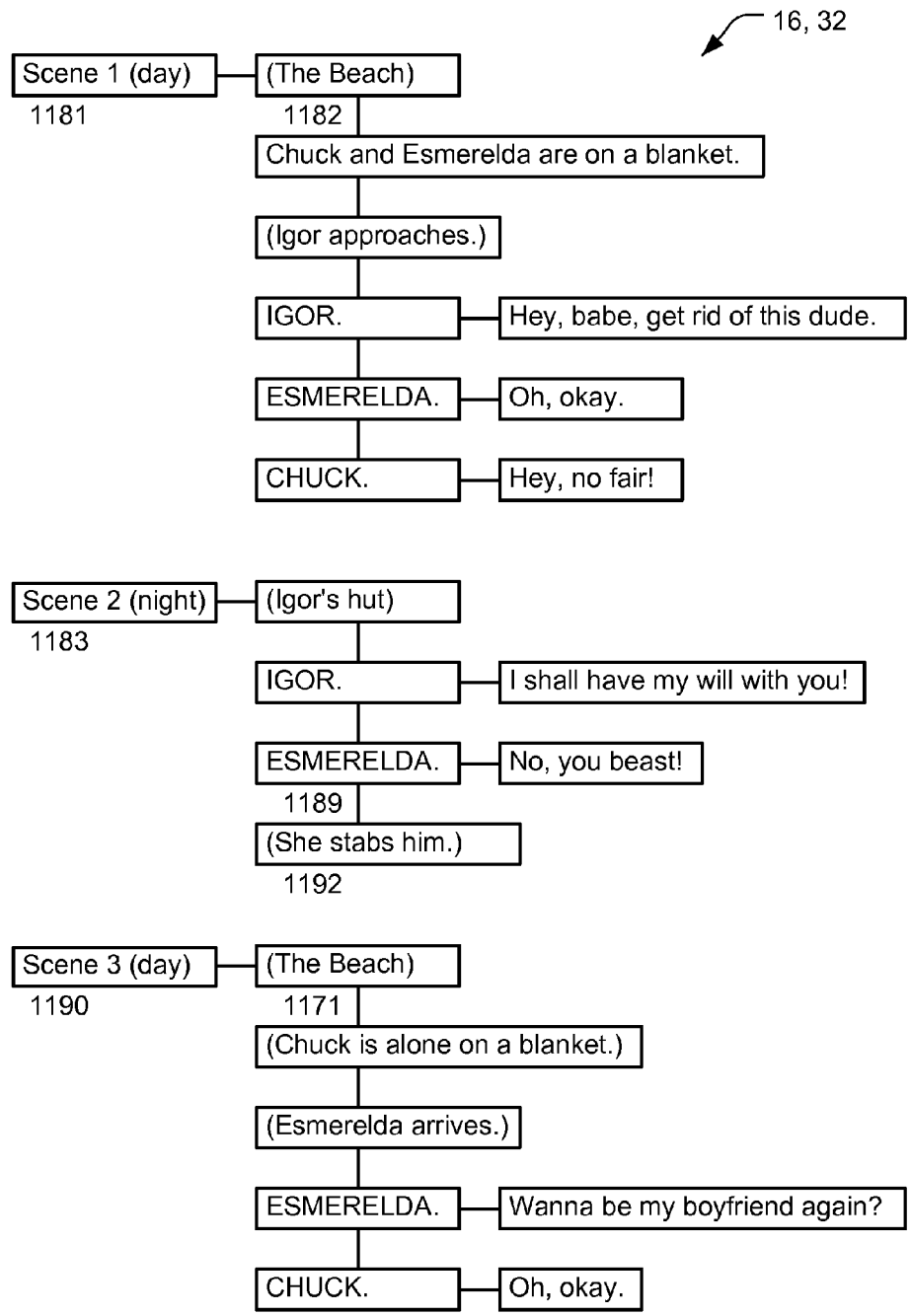

FIGS. 16a-c are block diagrams depicting how slices with cells therein represent three different datasets used in an example film production, wherein FIG. 16a shows a production schedule, FIG. 16b shows a film script, and FIG. 16c shows a director's notes.

FIG. 17 is a block diagram depicting how the schedule and script of FIGS. 16a-b can be connected along two dimensions.

Figure 18:
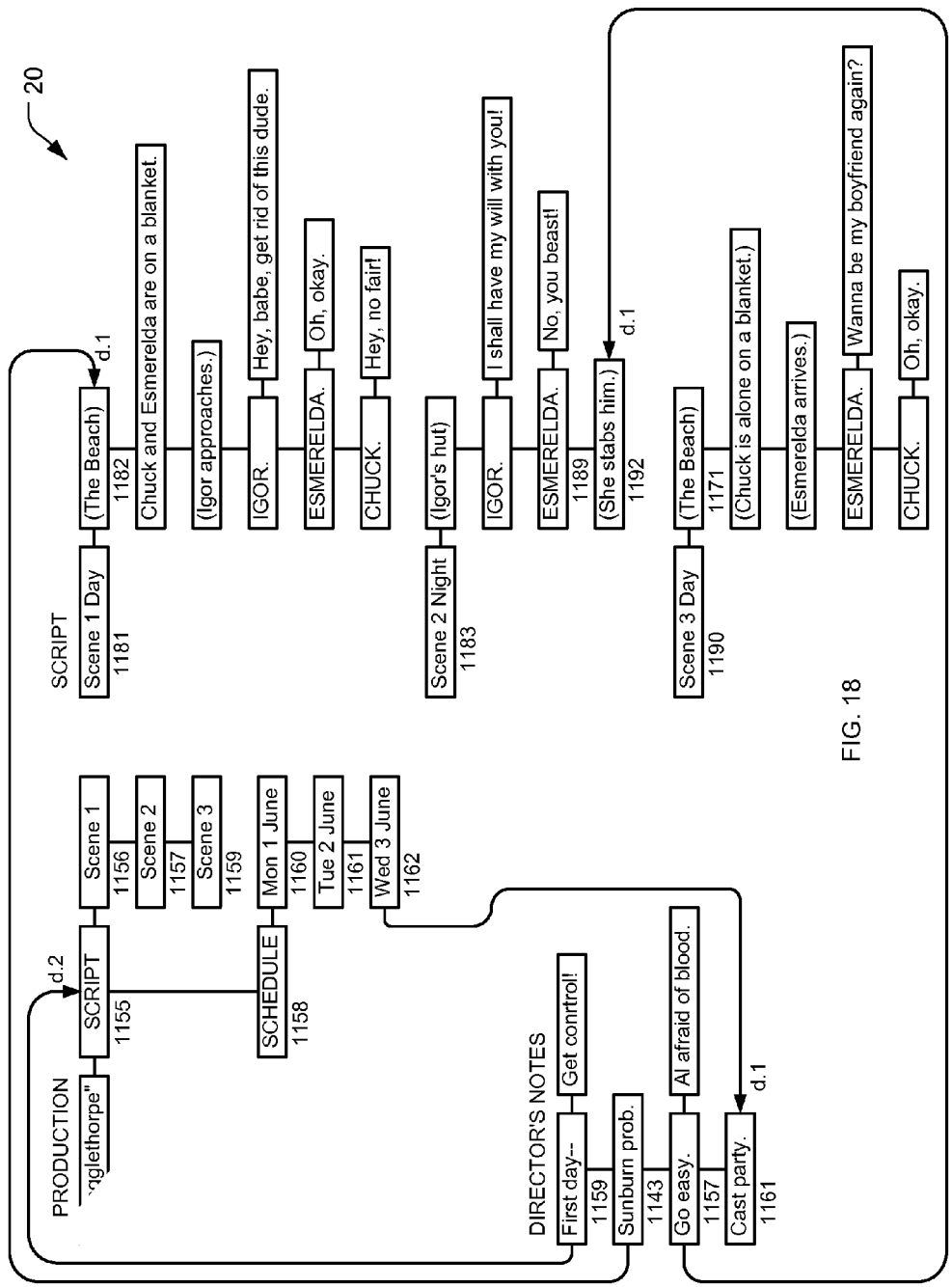

FIG. 18 is a block diagram depicting how the schedule, script, notes datasets of FIGS. 16a-c can all be connected along two dimensions.

In the various figures of the drawings, like references are used to denote like or similar elements or steps.

DETAILED DESCRIPTION OF THE INVENTION

A preferred embodiment of the present invention is a system for combining datasets and information structures by intercalation. [In this context, "intercalation" means to break and insert. It originally meant to "stick an extra day in the [Roman] calendar," where it was possible to bribe those who maintained the calendar (the "calends"). In more modern usage the term is used in calendars, chemistry, and other fields for discrete insertion among consecutive units. In the calendar, it now refers to leap days and other special days inserted in a time period; in chemistry, it refers to molecules and atoms inserted between others, sometimes reversibly. In the present context, we use it for cells to be reversibly inserted between other cells in a docking procedure between sections of cells (slices).] As illustrated in the various drawings herein, and particularly in the views provided therein, preferred embodiments of the invention are depicted by the general reference character 10.

As noted in the background discussion above, the present invention builds on the teachings of U.S. Pat. No. 6,262,736 by the present inventor. Briefly, the prior invention permits "hyperspaces" or information structures (sometimes termed "zzstructures") to be built from individual information cells (sometimes termed "zzcells") with one or more connections in one or more discrete dimensions. Such hyperspaces may then be spatially viewed and interactively modified, and programs may be created which work upon the information.

In more detail, a hyperspace is a set of relations and the structures allowed within that set of relations. A cell is the basic unit of a hyperspace, and the hyperspace may contain logically "linear" chains of connected cells. The cells and their manner of interconnection with connectors introduces the notion of dimensions. A dimension is an independent relational ordering in which "negward" and its complement "posward" are defined. A particular dimension is independent of any other dimension, and it follows that negward and posward in one dimension are unrelated to negward and posward in any other dimensions. A cell exists in every dimension, whether or not connected therein, and so may be viewed simultaneously in every dimension. Users of a hyperspace, however, can typically only comprehend seeing two or three dimensions of connections for a cell at once.

In the inventor's implementations based on U.S. Pat. No. 6,262,736, an actual connection between two cells is normally represented by two key-value pairs. For example, if a 38 cell points to a 90 cell along a d.1 dimension, that connection can be represented by two reciprocal key-value pairs: 38+d.1=>90 and 90−d.1=>38. These two key-value pairs taken together thus represent the connection between the two cells. This means that to find out what (if any) cell is connected to the 38 cell along the d.1 dimension, a database used in the implementation can be asked "38+d.1?," and the database will return the answer "90," indicating that the 90 cell is connected there. To find out what (if any) cell is reciprocally connected to the 90 cell negward along the d.1 dimension, the database can be asked "90–d.1?," and the database then returns the answer "38," indicating that the 38 cell is connected there.

Figure 1A:
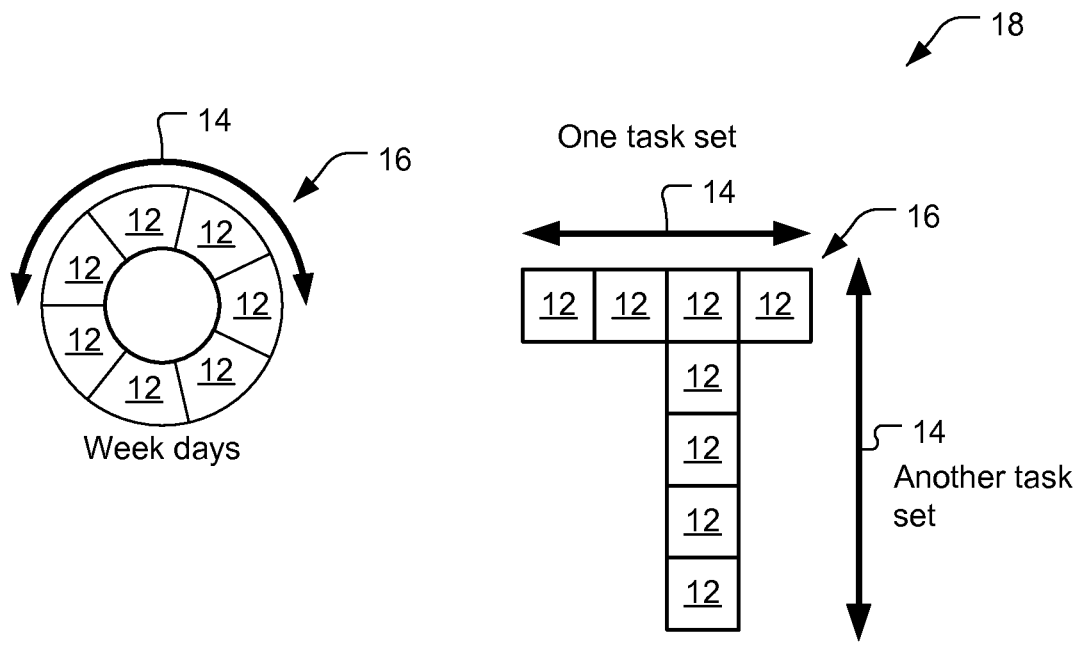
Figure 1B:
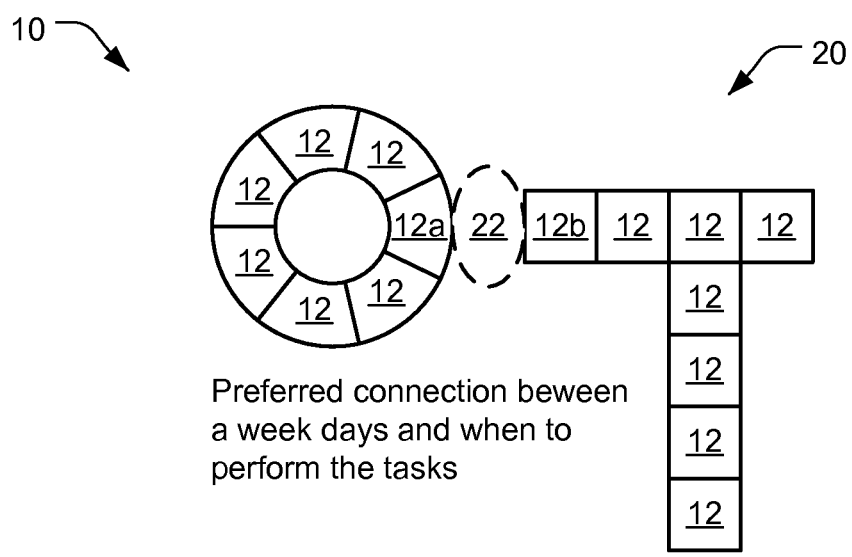

FIGS. 1a-b are schematics depicting basic elements of an exemplary embodiment of the present invention for combining datasets and information structures by intercalation (hereinafter the "system"). The system 10 extends upon the principles discussed above to allow datasets or information packages to be combined into aggregates having properties additional to those manifested in them individually. A cell 12 is the basic unit representing an individual datum within the system 10, and the cells are logically connected along dimensions 14.

The datasets or information packages are herein termed "slices" (rather than "hyperspaces" or "zzstructures"). A slice 16 refers to a portion of the overall space 18 that is present, i.e., what results when one considers all of the separate connections, between all of the cells 12, in however many dimensions 14. Each slice 16, thus, contains connections in some arbitrary set of dimensions 14, and other slices 16 may or may not have connections in these same dimensions 14. Alternately stated, using the "hyperspace" terminology again, each slice 16 can be viewed as a distinct hyperspace within the overall space 18, and what we wish is a way to combine the slices 16 by expressing "latent connections" to produce a mega-hyperspace that is an aggregate or combined conglomerate structure 20.

Confirmed by long association with programmers who share these views, the inventor's preference in embodying the system 10 is that each slice 16 should be legitimate, complete and well-connected by itself. This is a nice but optional manner in which the system 10 can be implemented. It is an elegant ideal rather than a technical necessity, yet one with notable advantages. For example, it is easier to implement, it is easier to fix, it is easier to change later, it is easier to remember, and it is easier to document.

The general idea is for the cells 12 in one slice 16 to point to individual cells 12 in another slice 16 to which there is a preset preference that they be connected, that is, where they will link into the conglomerate structure 20 when the preset preferences are expressed. The inventor terms these preset preferences "latent preferences," which has caused some readers confusion. The key point to grasp to avoid such confusion is to appreciate that the preset preferences are just that, preset.

Dictionaries define "latent" as "present but not visible, apparent, or actualized; existing as potential: latent ability." For present purposes, the preferences exist and the inventive system 10 works with them without particular regard to how they came to exist. For example, they may have been "hard coded," that is, specified by a human user. For instance, foreshadowing an example discussed further presently, the user may have Wednesday as their day off from work, so they might overtly specify that Wednesday is the day to perform non-essential tasks. The user may then further overtly specify that washing their dog is a non-essential task. Very simplistically put, the system 10 then provides cells representing the days of the week, a cell representing the task wash the dog, and a linking mechanism connecting the Wednesday cell to the wash the dog cell.

Alternately, preset or latent preferences may be automatically created by the system 10 in some situations. For instance, foreshadowing another example, a user may perform operations on a main-slice that separate out from it a first-child-slice and a second-child-slice. Since there were already clear relationships between the cells in the original main-slice, the system can automatically generate preset preferences between the cells now in the respective slices. Then, when the main-slice and the first-child-slice are expressed together, one resulting conglomerate structure 20 is presented; when the main-slice and the second-child-slice are expressed together, another resulting conglomerate structure 20 is presented; and when all three slices 16 are expressed, yet another resulting conglomerate structure 20 is presented.

The linking mechanism used for representing the preset or latent preferences between the cells 12 is termed a "latent connection" (latent connection 22; shown generically in FIG. 1b as simply a phantom element). A cell 12 "making" a latent connection 22 is called the choosing cell 12a and the cell 12 "selected" for the latent connection 22 is called a target cell 12b. Again, the term "latent" is used as in the dictionary definition of "present but not visible, apparent, or actualized; existing as potential: latent ability."

FIGS. 1a-b illustrate a very simplistic example of two slices 16 being expressed into a conglomerate structure 20. The left-most slice 16 represents days of the week and the right-most slice 16 represents related sets of tasks. TBL. 1a lists the contents of the cells 12 in the left slice 16. And TBL. 1b lists the hypothetical contents of the cells 12 in the right slice 16.

In this example, a dog's owner usually has Wednesday off from work, so that is their preferred day to perform routine dog care tasks. The dimension 14 in the left slice 16 is essentially self explanatory; the days of the week cycle endlessly. The horizontal and vertical dimensions 14 in the right slice are respectively represented by the left- and right-most columns in TBL. 1b. The dog's owner must first catch the dog (since, as most pet owners know, animals sense what we have in mind for them and know when to stay out of our clutches). Once caught, the dog is bathed and dried. Drying is necessary before performing the tasks along the vertical dimension 14. Thus, the dog is muzzled, its basic medical needs are attended to, and the muzzle is removed before completing the final task along the horizontal dimension 14 (combing the dog).

There are several ways of representing a latent connection 22. In one approach, the choosing cell 12a in one slice 16 can reflect this by being given a one-way pointer to the target cell 12b. This means, however, that the target cell 12b should not reciprocate the connection to its choosing cell 12a, since reciprocal connections to more than one slice 16 might then have to maintained. It is nonetheless desirable to allow different slices 16 to make different virtual connections to the same target cell 12b. Such virtual connections should not be restricted; indeed, we should restrict such connections as little as possible. Three different approaches that can be used for this are "half-links," "marshmallows," and "preflets"

Figure 2A:
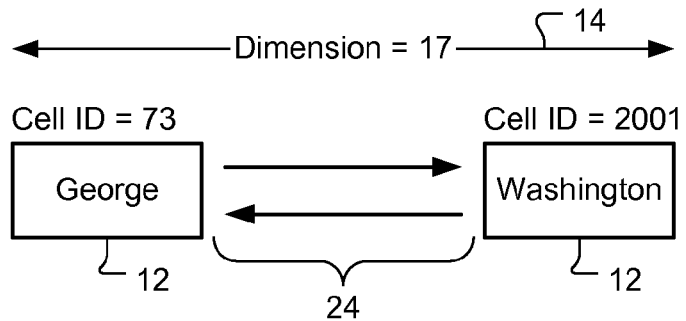
Figure 2B:
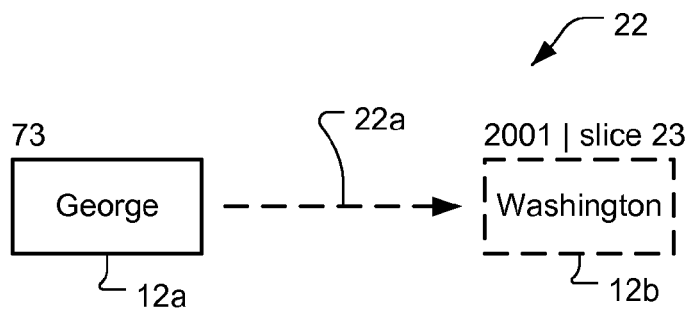
Figure 2C:
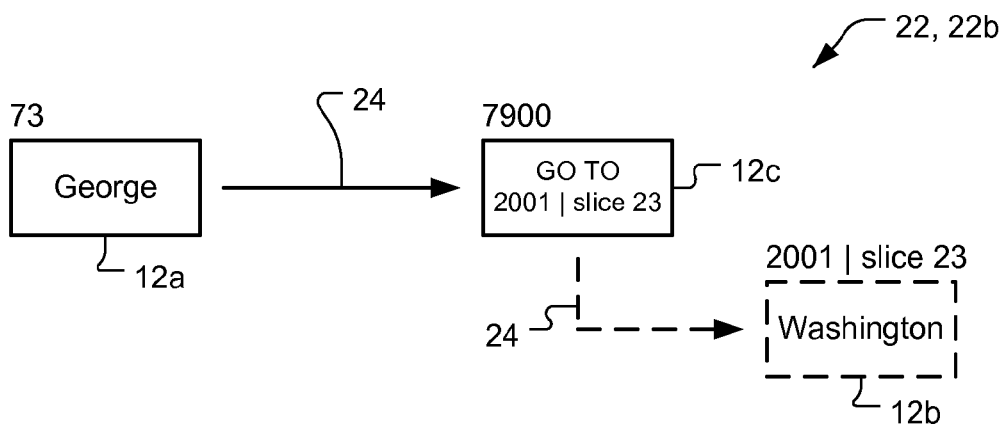

FIGS. 2a-c are schematics stylistically depicting connection mechanisms, and TBLS. 2a-c list example hash table contents for implementations of those respective mechanisms. The system 10 can advantageously be implemented with hash tables, because they are very efficient for handling random and unpredictable data. Each element in a hash table has a key (what you ask it) and a value (what it tells you in reply). One never has to predict what will happen next with a hash table. A hash table is not as fast as a table in RAM, for instance, but as datasets and information structures get more complicated and less predictable, and change more and more, hash tables become the method of choice in many applications and the system 10 is a case where this often will apply.

FIG. 2a shows a full-link 24 as it is usually represented. A first cell 12 is identified as "73" and contains the data "George." It is connected to a second cell 12 that is identified as "2001" and contains the data "Washington." For the sake of this example, these cells are being connected along dimension 14 number 17.

FIG. 2*b* shows an example based on an approach which the inventor has developed using half-links 22*a*. Here a first cell 12, again identified as "73" and containing "George," is a choosing cell 12*a*. Another, second cell 12, here identified as "2001" and containing "Washington," is a target cell 12*b*. The target cell 12*b* resides in a slice 16 identified as "23" (a different one than the first cell 12 resides in). The choosing cell 12*a* holds a connection (as a key-value pair) to the absent target cell 12*b*, but the target cell 12*b* does not reciprocate.

In programming aesthetics the approach just shown is considered to be ugly, since it is a special case unlike the rest of the system 10 and it is prone to specific kinds of breakdown.

FIG. 2*c* shows an example based on another approach which the inventor has developed, using marshmallows 22*b*. Based on the concept of roasting a marshmallow on the end of a stick, a marshmallow 22*b* here is a dummy cell (added cell 12*c*) representing an external connection. In our example here the added cell 12*c* is identified as "7900" and contains "GO TO 2001|slice 23." As shown, a full-link 24 connects the choosing cell 12*a* to the added cell 12*c*, and a half-link 22*a* connects the added cell 12*c* to the absent target cell 12*b* that is in the slice 16 identified as "23."

This approach has the benefit that there are no special cases, but it also restricts each cell 12 to only one possible connection outside of its own slice 16, essentially represented by the marshmallow 22*b*.

The following are major desiderata. It should be possible to maintain the integrity of each slice 16 as fully-connected cells 12. It should be possible to combine any slices 16, with any choices, and to provide a way for the slices 16 to be expressed into a specific consistent conglomerate structure 20. It should be possible for several different slices 16 to choose a same target cell 12*b*, and to resolve these choices into the consistent conglomerate structure 20. It should be possible for several different cells 12 in the same slice 16 to choose the same target cell 12*b*, and to resolve these choices into the consistent conglomerate structure 20. If there are contradictions in the data, with several requests for connection to a same target cell 12*b*, the result should still be a cleanly-connected into the conglomerate structure 20. It is desirable for the cells 12 of each slice 16 to be connected cleanly with two-way full-links 24 (in the manner described for the prior invention in U.S. Pat. No. 6,262,736 and shown above in FIG. 2*a*). We wish to avoid having any special cases that break the simplicity of the system 10.

The basic philosophy of the system 10 that the inventor presently prefers has two major rules. The same cell 12 may be chosen by many other cells 12. And on a given dimension 14, a cell 12 may only make one latent choice, i.e., have one latent connection 22. This is a simplifying rule intended to avoid too much complication resolving in the conglomerate structure 20. It also assures that there will be no conflicts for that cell 12 along that dimension 14, regardless of what other slices 16 are activated.

Figure 3:
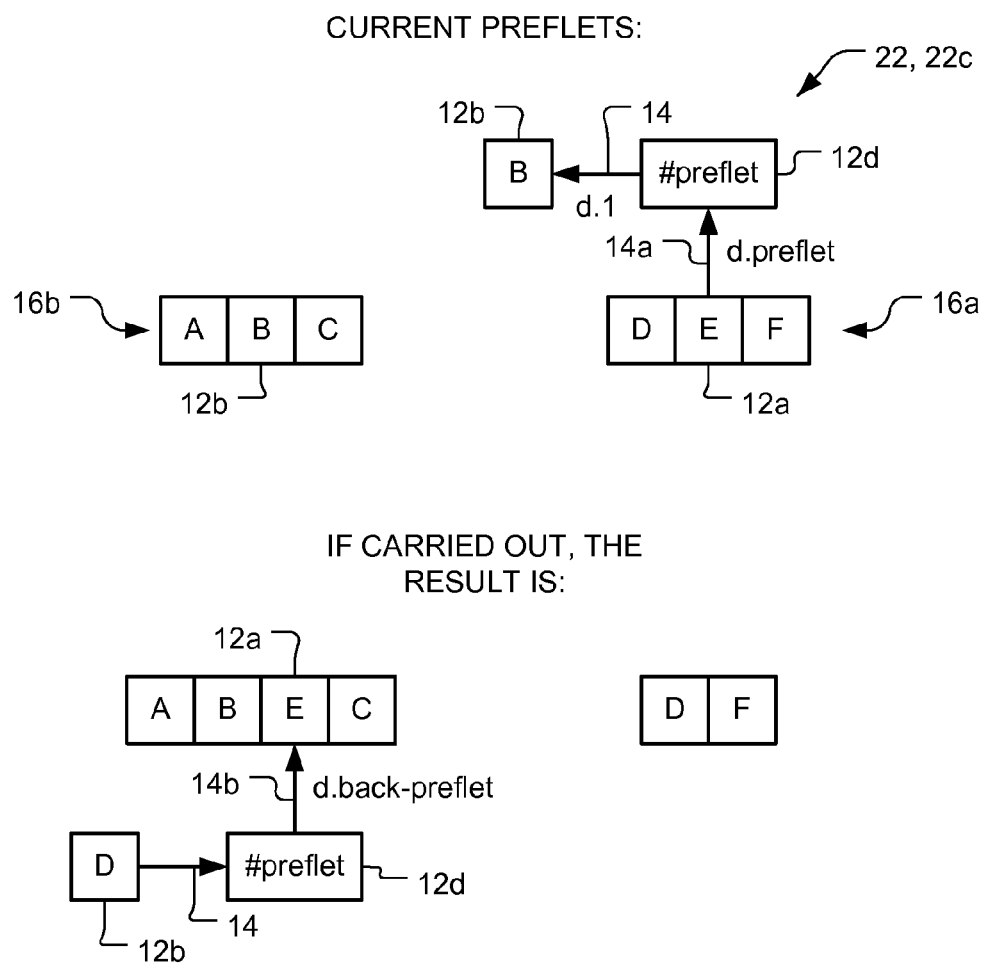
FIG. 3 is a block diagram depicting another latent connection mechanism in accord with the present invention.

FIG. 3 is a block diagram depicting the inventor's presently preferred approach for representing a latent connection 22, a preflet 22*c*. ("preflet" herein meaning a small expression of preference or choice). Here the use of latent connections 22 is assimilated into a 2-way connection structure itself, by representing each preflet 22*c* also by cells 12. This is not necessarily the only way to accomplish this. For example, it would be possible instead to represent a latent connection 22 by associated data items of text or other objects associated with the cells to maintain the latent connection. In the inventor's presently preferred embodiment, however, a fundamental structure of two-way connections between cells is maintained by the preflets 22*c*. In other possible approaches, however, such a consistent 2-way structure is not necessarily maintained.

In FIG. 3, six cells 12 (identified as A-F) are comprised in two slices 16: a choosing slice 16*a* and a target slice 16*b*. In actual implementation, the slices 16 are represented by files and the slices 16 are co-activated or melded into a conglomerate structure 20, by bringing them into memory at the same time.

A preflet 22*c* is represented by a special connection from the choosing cell 12*a* to a special cell 12*d* along a d.preflet dimension 14*a*. This can be quickly tested to see whether the choosing cell 12*a* has a preflet 22*c*. The special cell 12*d* contains the text "#PREFLET." This helps visual inspection. Any preflets 22*c* of the choosing cell 12*a* are then represented by the additional special cell 12*d* along the specific dimension 14 of the latent connection 22 being represented. For instance, if the choosing cell 12*a* chooses another cell (the ultimate target cell 12*b*) along the regular d.1 dimension 14, then there is a connection made along the d.1 dimension 14 from the choosing cell 12*a* to a special cell 12*d*, the contents of that additional special cell 12*d* is the ID of the target cell 12*b*.

Arbitrarily, preflets 22*c* can be allowed to operate only in one dimension, e.g., "negward," that is, in the negative direction along a dimension 14. This simplifies implementation. The system 10 can thus quickly test whether a cell 12 expresses a preflet 22*c*, simply by checking whether the cell 12 has a connection on the d.preflet dimension 14*a*.

A resolution phase is also provided. When two slices 16 are activated, the more-recently arriving slice 16 is scanned for preflets 22*c* by looking along the d.preflet dimension 14*a* from each cell 12. All the choosing cells 12*a* are then compared to see if any of them choose the same target cells 12*b*. Those choices with no conflicts are implemented at once. To remember the previous connection of a cell 12, another preflet 22*c* is created along a d.back-preflet dimension 14*b* (see e.g., FIG. 3) to show where that cell 12 is to reconnect when the conglomerate structure 20 is separated. The special cell 12*d* in this preflet 22*c* thus serves as a "back-preflet cell."

[Digressing, there are two methods that the inventor has employed. The two are nearly the same. In both the back-preflet points to the place to which the cell must snap back. In both cases, we create a back-preflet consisting of a #PREFLET cell which points to a cell containing the identifier of the target cell along the desired dimension, in the direction of the intended reconnection. In the first case, we attach it to the cell which will snap back on d.back-preflet. In the second case, rather than create an extra dimension, termed "d.back-preflet," to hold the back-preflet cell, we put it negward on the d.preflet dimension. That way the forward preflet (pointing to a chosen cell) is on the same dimension as the back-preflet pointing to the snap-back cell. The inventor has come to prefer the latter case.]

The resolution rule-set of the inventor's presently preferred embodiment is very simple.

[But it should not be interpreted as limiting the scope of the present invention, since other sets may be found to replace and possibly even improve on this set in other embodiments.]

In this rule-set: each slice 16 has a priority number which is unique (For simplicity, let's say that a low number means a higher priority); the choices are honored in the sequence of the priorities of the slices 16; two identical choices along a given dimension 14 result in the choosing cells 12*a* being connected in priority order to the target cell 12*b*; if more than one cell 12 in a particular slice 16 chooses the same target cell 12b, the requests are honored by ascending ID number; connections in the target slice 16b are broken and the choosing cell 12a is inserted according to the rules; and in some cases connections broken in the choosing slice 16a are re-connected with the choosing cells 12a missing.

Of course, once the principles here are appreciated it follows that sophisticated embodiments of the system 10 can employ latent connections 22 wherewith ranks of cells 12 between slices 16 can even be joined. [As taught in U.S. Pat. No. 6,262,736 by the present inventor, a rank is a consecutive set of cells which are connected in a given dimension.] For example, the ends of two ranks in different slices 16 can be connected by the system 10 to form a longer rank.

Continuing, here is an example of a choice conflict between slices. Suppose we have cells identified as A, B, C along a d.1 dimension in a 23 slice. Suppose further that the B cell is chosen as a connection target on the d.1 dimension by the an R cell in a 0 slice (call it 0.R) and a F cell in a 9 slice (call it 9.F). Honoring these latent connections in priority order results in: A, B, 0.R, 9.F, C.

Here is another example of a choice conflict within a slice. Suppose we again have the A, B, C cells along the d.1 dimension in the 23 slice. Suppose also that in a 24 slice both a 21 cell and a 64 cell choose the B cell in the 23 slice. The result here is; A, B, 21, 64, C.

FIGS. 4-15 depict examples that particularly illustrate the use of the #PREFLET type mechanism for latent connections 22, 22c. Some details related to implementing the system 10 in a computerized device are covered are also discussed in the overall context of these examples.

In the system 10, the slices 16 can conveniently be represented as files, or "slicefiles." This facilitates keeping them in storage (e.g., a conventional magnetic or flash drive) when they are not in use and copying or moving them into memory (e.g., random access memory or RAM) to perform operations on them. When multiple slicefiles are brought together in memory, their cells 12 can be commingled in various combinations according to the preset or latent preferences or relations between the cells 12. When the mix of the slicefiles changes in memory, these commminglings may change (that is, the resulting conglomerate structure 20 presented changes). When a slicefile is dismissed from memory, it reverts back to its previous arrangement of cells (unless the slicefile in external has changed). In the inventor's presently preferred embodiment of the system 10 this is managed by the preflet structures, both for organizing the commingling in memory and for return to external storage.

Figure 4:
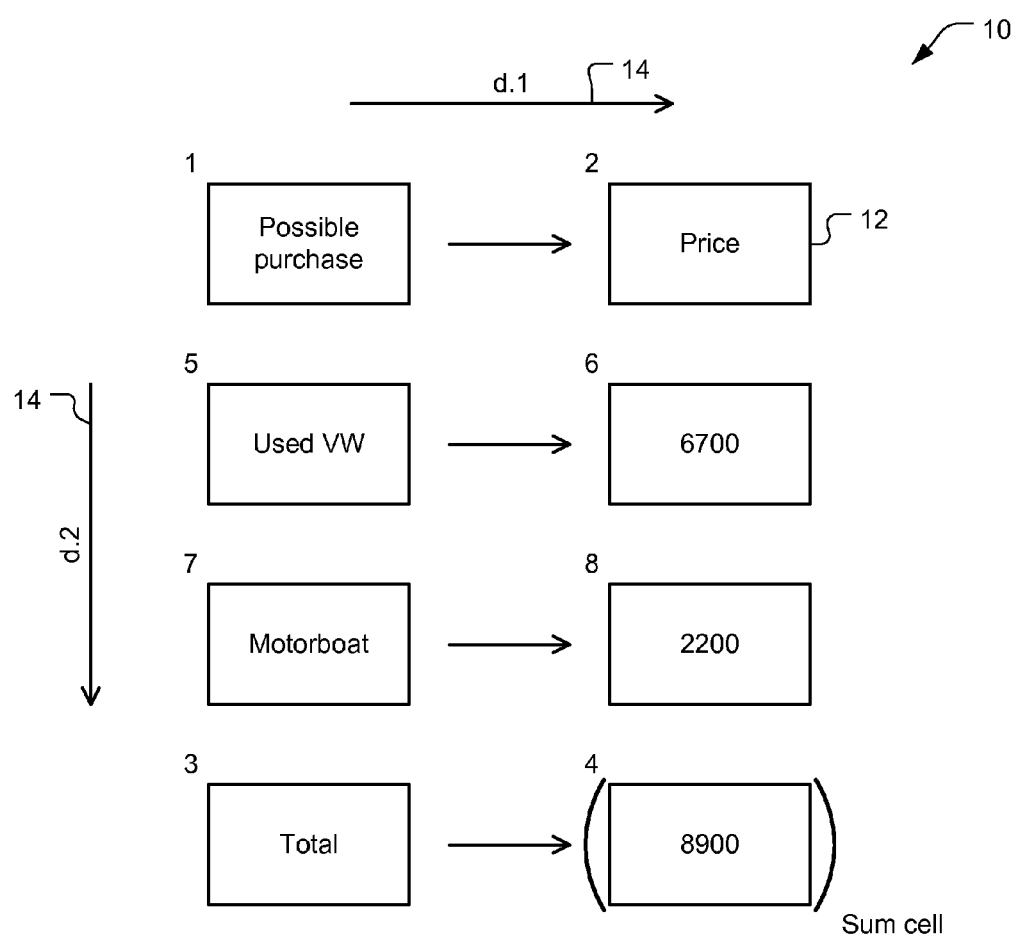
FIG. 4 is a block diagram depicting an overview of a series of following examples that particularly illustrate the use of the #PREFLET type mechanism for latent connections.

FIG. 4 is a block diagram showing an overview of the present example. The cells 12 here are individually labeled at their respective upper left corners (the peculiar ordering in the numbering here will become clear presently). In straightforward manner, a d.1 dimension 14 extends horizontally and represents the criteria under consideration (i.e., possible purchase and price). Similarly, a d.2 dimension 14 extends vertically and generally represents values of the respective criteria (i.e., what a possible purchase is and what its price is).

In this example a hypothetical user wants to list and visualize possible purchases of either a car (a Volkswagen™ or "VW" brand automobile), a motorboat, or both. The user chooses to do this listing and visualization on a main slice 16, which will be kept in a file having an initial priority of "1" and which is therefore referred to here as slicefile MAIN(1).

Figure 5:
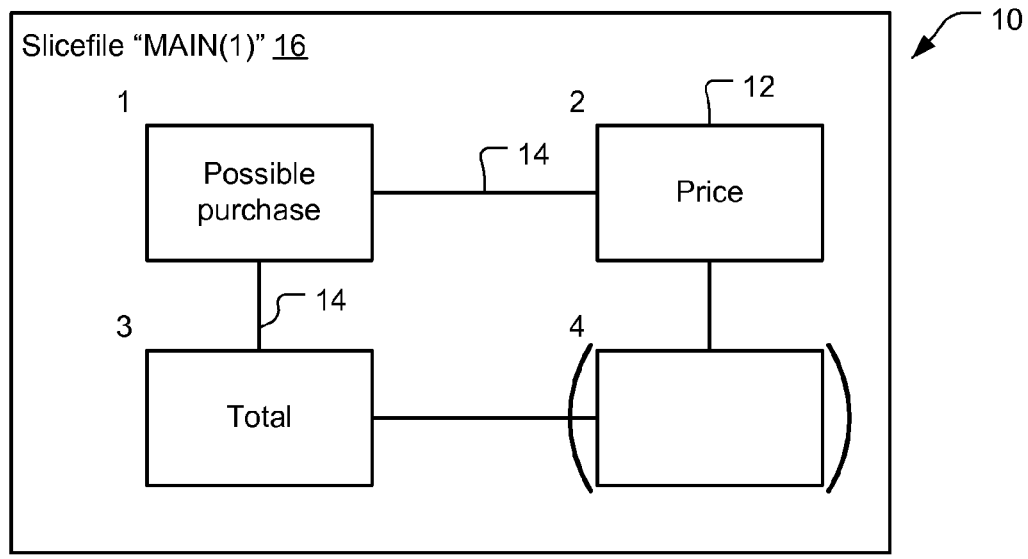
FIG. 5 is a block diagram depicting.

FIG. 5 is a block diagram showing a primitive or template slice 16 that the user begins with to create a slicefile labeled MAIN(1). With slicefile MAIN(1) in memory, the user makes a simple zzstructure to serve as a frame for considering the purchases. It can be seen here that the 4 cell is a sum cell, a particular type which automatically sums the numerical contents of other cells, and that this one is set up to add the contents of the cells negward from it in the d.2 dimension. Each time a cell that is negward on the d.2 dimension is changed, or a new cell is intercalated by a slice, the sum cell is recalculated. This function is straightforward, being similar to spreadsheet recalculation, and coincidentally illustrates here how the system 10 can employ conventional data processing principles when they are useful.

Figure 6:
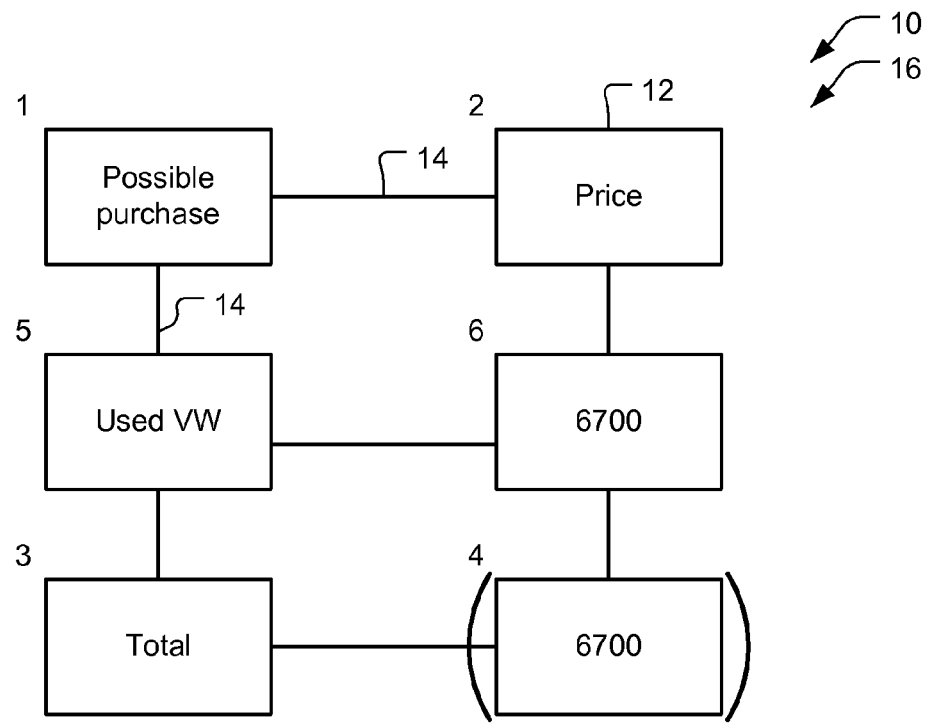
FIG. 6 is a block diagram showing the insertion of a new row of data into the slicefile.

FIG. 6 is a block diagram showing the insertion of a new row of data into slicefile MAIN(1). A NEWCELL command is executed to add a 5 cell posward on the d.2 dimension from the 1 cell, and given the content "Used VW." By the mechanics of the NEWCELL command, the 5 cell is placed between the existing 1 cell and the existing 3 cell on the d.2 dimension. Another NEWCELL command is then used to create a new 6 cell posward on the d.2 dimension from the 2 cell, and to give it the contents "6700." [Alternately, implementations of the system 10 may use a NEWROW command to simplify this.] Coincidental to this the 4 cell (the sum cell) calculates and now shows the total, 6700.

Digressing briefly, FIGS. 5-6 employ an optional but helpful visualization tool. The dimensions 14 here have been shown stylistically. Such a visual remainder can be useful, especially for large amounts of data, complex data, or complex applications data. For instance, consider the dimensions in FIGS. 1a-b where one is circular, or those in FIGS. 16a-c, 17, and 18 where some are unidirectional, representing timelines. Other cases for possible dimensions include polar coordinate or Smith chart formats (say, for radio engineering data).

Figure 7:
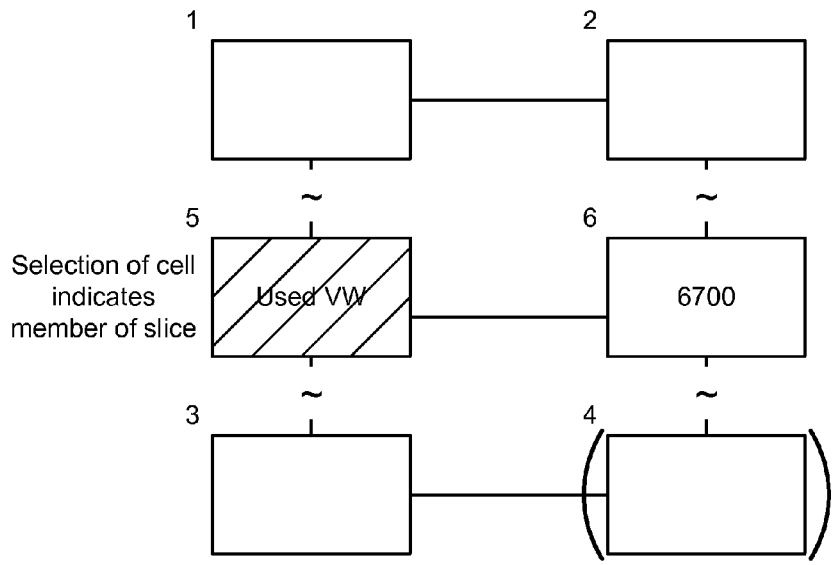
FIG. 7 is a block diagram showing how our user can use a CARVESLICE command to now carve the just created data row into a separate slice (slicefile "CAR(2)").

FIG. 7 is a block diagram showing how our user can use a CARVESLICE command to now carve the just created data row into a separate slice. This entails selecting the 5 cell to be a member of the new slice. The system 10 then breaks the connections for the 5 cell, as well as its associated 6 cell, thus "liberating" these cells from the original slice 16. The system 10 now treats these cells as a separate slice that is independent of the other cells of slicefile MAIN(1). The user is prompted to provide a new slicename (which in the preferred embodiment is a filename as well) and enters "CAR." This slicefile is by default in this embodiment of the system 10 given priority 2, the next available priority, so this file is now referred to as slicefile CAR(2).

Figure 8:
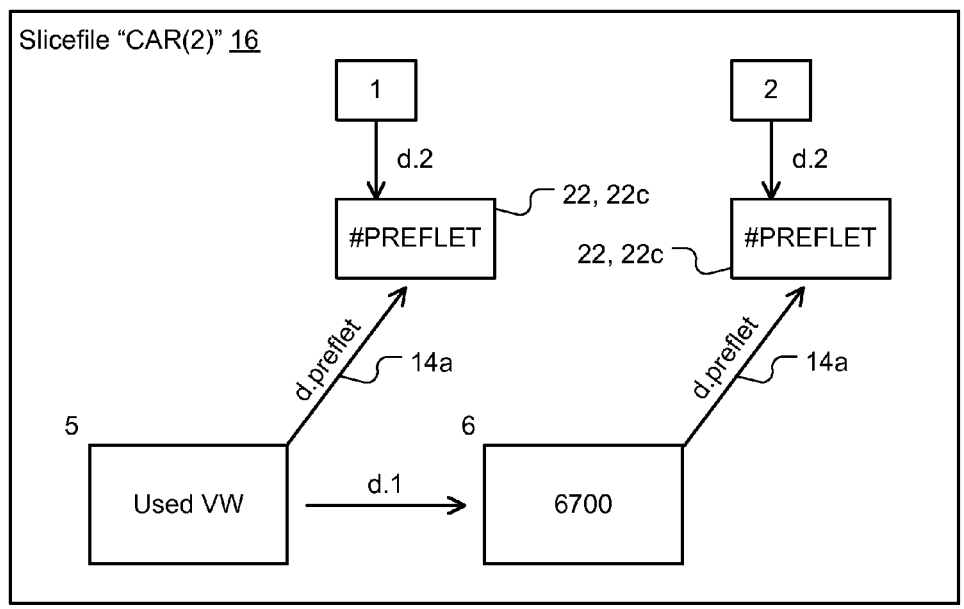
FIG. 8 is a block diagram showing how the preflet mechanism of the system makes note of the latent connections created by carving operation.

FIG. 8 is a block diagram showing how the preflet mechanism of the system 10 makes note of the latent connections 22, 22c here. To complete the slice carving process, and to represent the preset connection structure now established, the preflet-making routine builds preflets in the slicefile CAR(2) as follows. A preflet is created from the 5 cell on a d.preflet dimension and also on the d.2 dimension to represent that the 5 cell has a preset connection to the 1 cell on the d.2 dimension. Similarly, a preflet is created from the 6 cell on the d.preflet dimension and the d.2 dimension to represent that the 6 cell has a preset connection to the 2 cell on the d.2 dimension. These newly-created preflets are part of the structure now stored in slicefile CAR(2).

Figure 9:
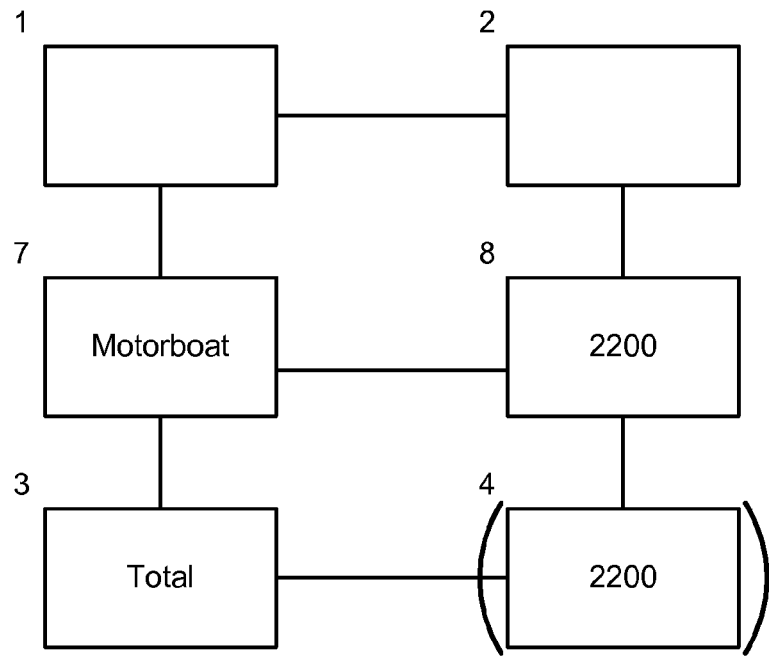
FIG. 9 is a block diagram showing the insertion of a new row of data into the slicefile.
Figure 10:
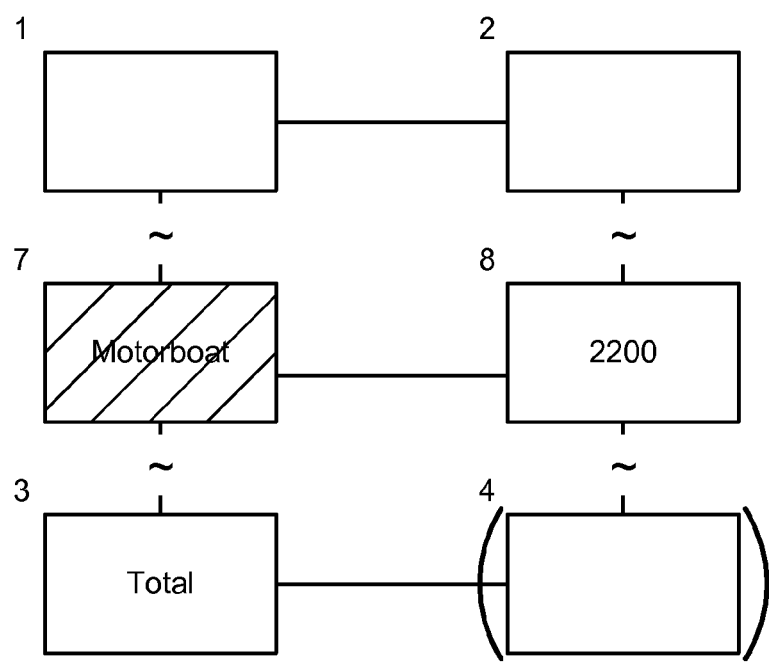
FIG. 10 is a block diagram showing how our user can use a CARVES LICE command to now carve the just created data row into a separate slice (slicefile "BOAT(3)").

FIGS. 9-11 are block diagrams depicting a similar scenario, only here for the possible purchase of the motorboat. For this a 7 cell ("Motorboat") and an 8 cell ("2200") are added to MAIN(1) (to what was left after we "removed" the 5 cell and the 6-cell, and effectively returned MAIN(1) to the content depicted in FIG. 5). The CARVESLICE command is used to now carve the just created data row into a separate slice, in a slicefile labeled "BOAT." The preflet mechanism of the system 10 makes note of the latent connections 22, 22c here. And these newly-created preflets are part of the structure now stored in slicefile BOAT(3) (by default priority 3 here, but that is a mere matter of configuration of the system 10, and it is anticipated that most embodiments will have a CHANGEPRIORITY command).

Figure 13:
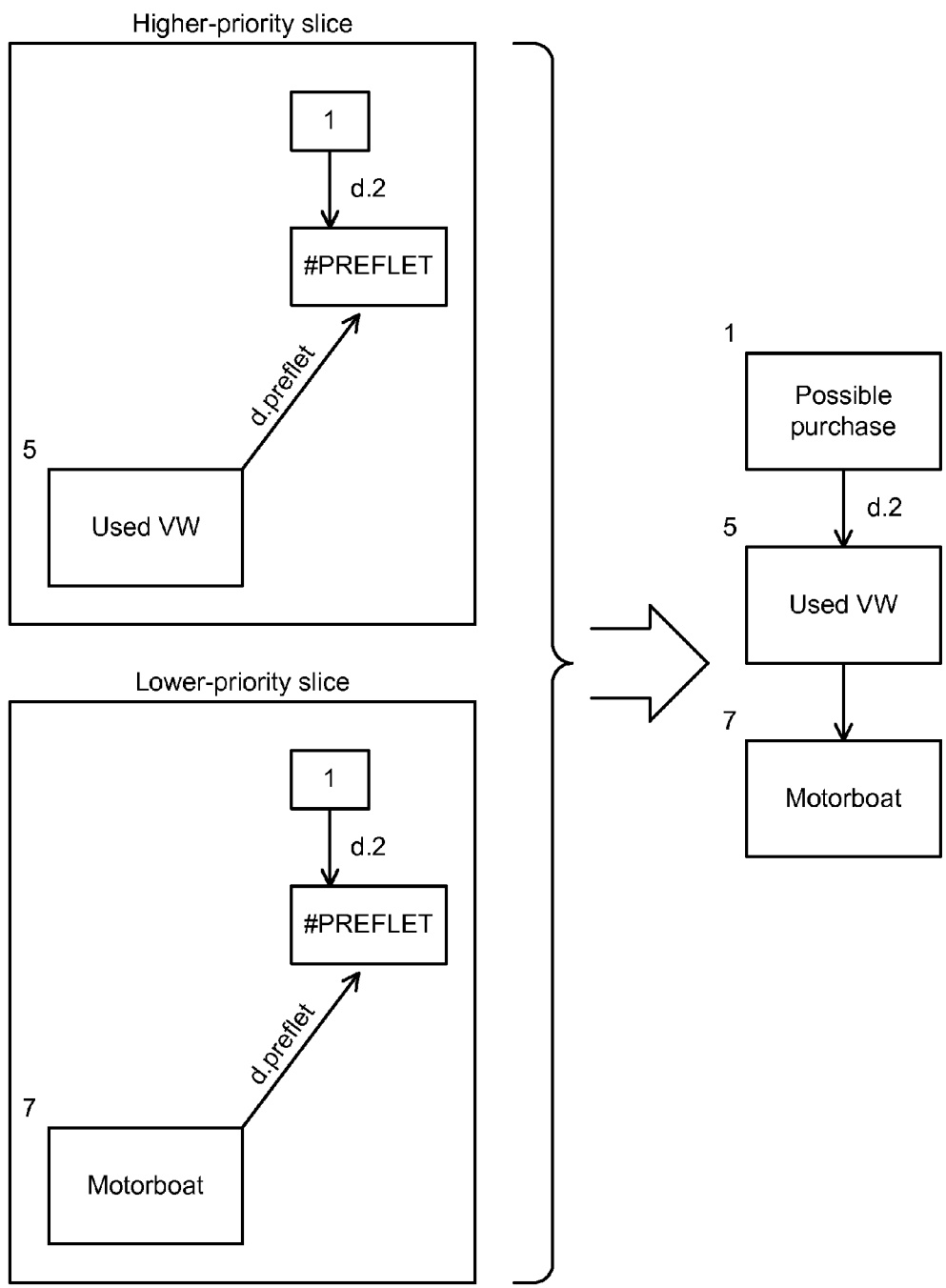
FIG. 13 is a block diagram showing this resolving operation when both slicefile CAR(2) and slicefile BOAT(3) are brought into memory with slicefile MAIN(1).

Note that slicefile CAR(2) and slicefile BOAT(3) above were stored, meaning here that they were copied to external storage and removed from the memory. Accordingly, the memory now again contains only slicefile MAIN(1) (see e.g., FIG. 5). Either slicefile CAR(2) or slicefile BOAT(3) may be brought into memory, or both, with respectively different consequences as the preflets are enacted to activate their preset connections. FIG. 12 shows this resolving operation when slicefile CAR(2) is brought into memory with slicefile MAIN(1), and FIG. 13 shows this resolving operation when both slicefile CAR(2) and slicefile BOAT(3) are brought into memory with slicefile MAIN(1). For simplicity, FIG. 12-13 only show the possible purchase columns, but the price columns resolve similarly. This can be seen in FIG. 4.

Figure 14:
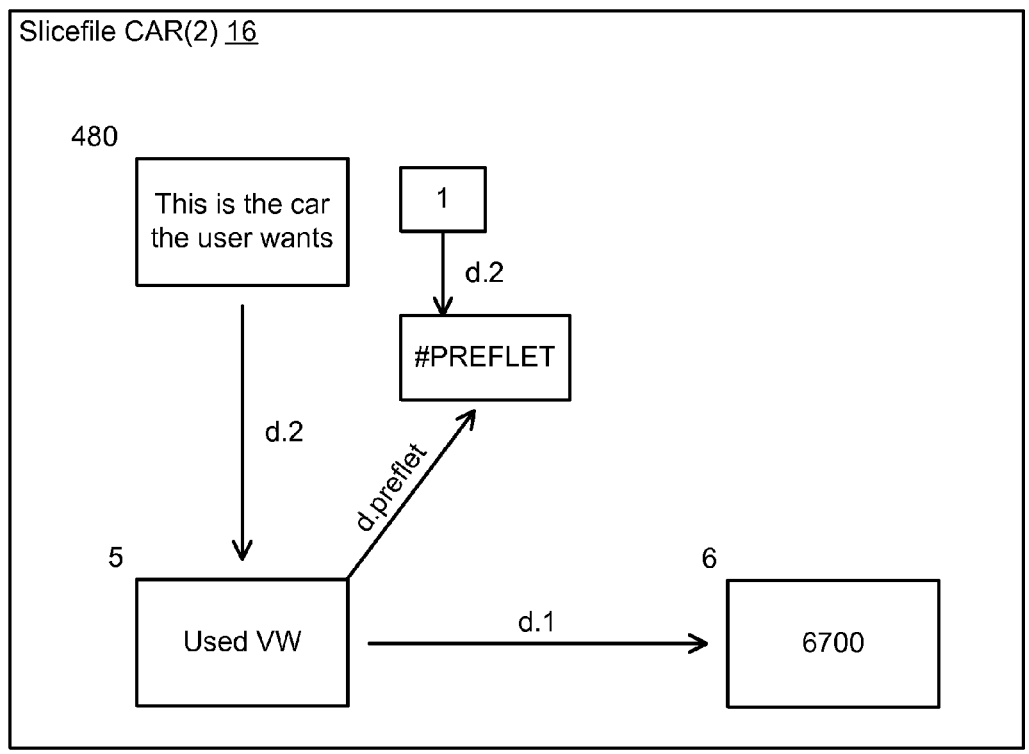
FIG. 14 is a block diagram showing a scenario where slicefile MAIN(1) is in memory, and the user brings in the slicefile BOAT(3).

Consider FIG. 14. In the scenario here slicefile MAIN(1) is in memory, and the user brings in the slicefile BOAT(3). The cells in BOAT(3) are unpacked and imported by the resolution routines of the system 10, resolving the preflets 22, 22c as follows. The preflet on the 7 cell is enacted, inserting it between the 1 cell and the 3 cell. In the same manner, although not shown, the preflet on the 8 cell is enacted, inserting it between the 2 cell and the 4 cell. Note that 4 cell (the sum cell) is triggered, adding the contents of the 8 cell to its null contents, to contain 2200.

Figure 15:
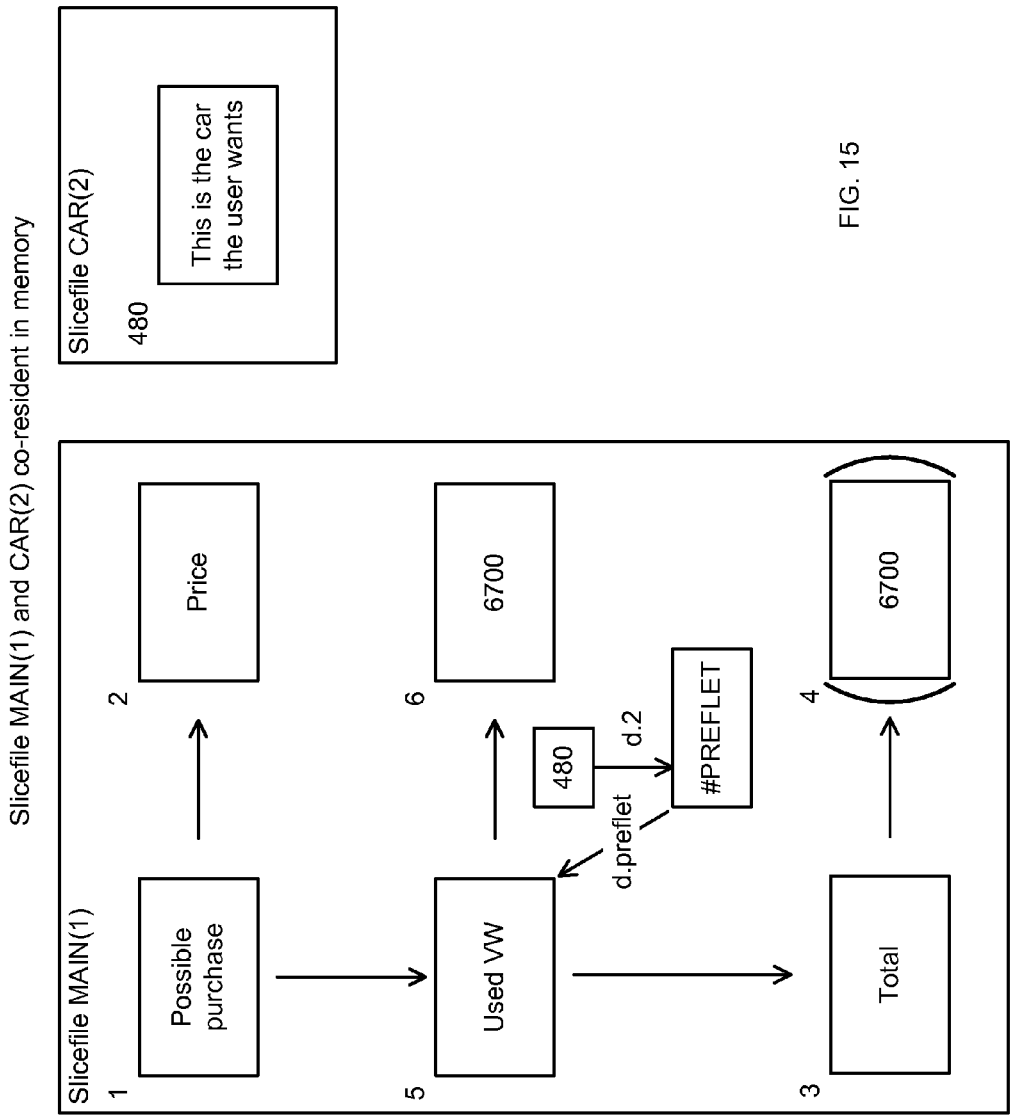
FIG. 15 is a block diagram showing a scenario where the user now brings in the slicefile CAR(2).

Next consider FIG. 15. If the user now brings in the slicefile CAR(2), its preflets are unpacked and its cells are imported by the resolution routines of the system 10, which resolve the cell connections into their earlier relationships. Because slicefile CAR(2) has a lower priority than slicefile BOAT(3), it takes precedence, and its preflets are honored first in this preflet resolution process. That is, the latent connections 22, 22c of the different cells are compared and honored according to slice priority. The different preflets contending for the same target cell are compared, and the cells are attached after that target cell in order of their priorities. The two cells whose preflets point to the 1 cell (the 5 cell and the 7 cell) are compared for priority. Since the 5 cell has a higher priority, it is put next to the 1 cell posward on the d.2 dimension, and the 7 cell is put next, posward on the d.2 dimension. The two cells whose preflets point to the 2 cell (the 6 cell and the 8 cell) are compared for priority. Since the 6 cell has a higher priority, it is put next to the 2 cell posward on the d.2 dimension, and the 8 cell is put next, posward on the d.2 dimension. Note that the sum cell is again triggered, adding the contents of the 6 cell and the 8 cell to its null contents, to contain 8900.

If either slicefile BOAT(3) or CAR(2) is dismissed by a DISMISS-SLICE command, its data row is removed from slicefile MAIN(1) in memory. In the slicefiles being returned to storage, preflets are rebuilt by the preflet-making routine. In these cases, the recalculation results in returning the slicefiles to storage in their previous form. (In each case, the sum cell is recalculated based on the cells negward from it on the d.2 dimension.)

A back-preflet is used for noting a preset position in a slicefile from which a cell is being moved to another preset position in another slicefile, providing a path for it to snap back. When it leaves the other preset position, the file is decoupled from other slicefiles and returned to storage, with its cells snapping back to their previous arrangement. For example, consider the slicefile CAR(2). If a user changes arrangements in that slice, such changes might seem to block its preset connections to slicefile MAIN(1). [In the figures, the direction of the arrow from the preflet cell ("#PREFLET") is meant to indicate the direction of the requested connection. If it is posward on d.2, it means the cell is to connect posward on d.2 to the chosen cell; if it is negward on d.2, it means the cell is to connect negward on d.2.]

For instance, suppose that slicefile CAR(2) is edited by a user while it is NOT co-resident in memory with slicefile MAIN(1) and therefore its preset connection is NOT enacted as in the previous example. Suppose the user puts a 480 cell on the d.2 dimension in slicefile CAR(2), negward of the 5 cell. FIG. 14 depicts this case. This is independent of the preflet on the 5 cell expressing a latent connection to the 1 cell when it is co-resident with the 1 cell. Now suppose that slicefile CAR(2) becomes co-resident in memory with slicefile MAIN(1). In the resolution process, the preflet is honored (with precedence over its connection in slicefile CAR(2)) and the 5 cell is again connected with the 1 cell in slicefile MAIN (1). FIG. 15 depicts this case. Meanwhile, while it is in slicefile MAIN(1), the 5 cell is given a back-preflet, showing where it is to reconnect to the 480 cell when it is no longer co-resident with the 1 cell. That back-preflet is then honored when slicefile CAR(2) is restored and returned to external storage.

FIGS. 16a-c, 17, and 18 depict an extended example. FIG. 16a-c are block diagrams showing how three slices 16 with the cells 12 therein can represent three different datasets: a production schedule dataset 30 (FIG. 16a) for a short filmscript, a script dataset 32 (FIG. 16b), and a director's notes dataset 34 to himself (FIG. 16c). As can be seen, each portion of text in a slice 16 is in a specific cell 12, and each of the slices 16 may be examined and manipulated by itself and viewed in different ways.

However, when any combination of the slices 16 is in memory simultaneously—datasets 30, 32 together, datasets 32, 34 together, datasets 30, 34 together, or even datasets 30, 32, 34 all together—their latent connections 22 are honored and the data in their cells 12 is unified so that each combination produces a different conglomerate structure 20 which adds detail.

The script dataset 32 contains three actors (Igor, Esmerelda, and Chuck) and three scenes (Scene 1, Scene 2 and Scene 3). The outline production schedule dataset 30 contains simply connection-points for attaching the scenes and three dates. The director's notes dataset 34, we may assume, is meant to be private, but will attach to both the script dataset 32 and the schedule dataset 30 when they are brought in together.

FIGS. 17 and 18 are block diagrams showing application of the system 10 to the slices 16 (datasets 30, 32, 34) in FIG. 16a-c. In FIG. 17 the schedule dataset 30 and the script dataset 32 are connected along two dimensions 14: d.1 and d.2. In FIG. 18 the notes dataset 34 is also connected along the d.1 dimension 14 and the d.2 dimension 14, to the schedule dataset 30 and the script dataset 32.

What FIGS. 17 and 18 particularly show is how the system 10 facilitates adding detail. The text of the script dataset 32 is easily added to a skeleton outline. Hidden data is permitted, e.g., the notes dataset 34. And particularly, multiple uses of same data, albeit differently structured, are now possible. The script dataset 32 is now simultaneously connected to a "Production" list in both its original sequence (hung at the cells 12 identified as 1156, 1157, 1159) and in a different order to the "Schedule" list (the cells 12 identified as 1160, 1161, 1162).

Thus, in the present invention, individual cells 12 in one slice 16 maintain virtual connections with individual cells 12 in other slices 16 as stored latent connections 22. When two or more slices 16 are used together, the latent connections 22 are changed to actual connections among the cells 12, thus making from the combined slices 16 a unified whole conglomerate structure 20 that is distinct from, and differently connected than, the parts taken separately.

In summary, it is known, if by no other means than the present inventor's previous teachings in U.S. Pat. No. 6,262,736, how datasets or information structures (which are also termed "hyperspaces," "zzstructures," and "slices") can be represented as data containing cells (also termed "zzcells") that are connected (e.g., with full-links) along one or more dimensions. Problems with such prior approaches have remained, however, particularly with respect to how to represent such datasets or information structures in anticipation of their potential combination, and in how to usefully and efficiently express their actual combination and eventual discombination.

The present inventive system 10 addresses these needs by viewing the datasets or information structures as slices with sets of cells having full sets of proper connections (full-links), as well as some of the cells of a slice potentially having preset or latent preferences or relations to cells in other slices that they can link up with if the system 10 brings the slices together. Alternately, in terms reflecting the human centric goals the system 10 achieves, some of the cells of a slice have secret memories or yearnings of cells in other slices that they want to link up with if they get a chance. When combined, such slices then express these preset or latent preferences (that is, the latent connections are expressed) to temporarily knit up or aggregate the different slices into a conglomerate structure (or "mega-hyperspace").

Contemporaneously, the system 10 can prepare for the eventual re-disconnection of the slices by converting each link broken in the connection or merging stage, e.g., by converting it into an interim preflet or back-preflet.

Three example latent preference representation mechanisms (latent connections 22) have been described herein, although others and possible variations of all of these are encompassed within the spirit of this invention. The half-links approach is the simplest and crudest and ugliest solution, one which improperly elevates a mechanism to an actual logical part of the system 10, but one that is workable. The marshmallow approach, by analogy with a marshmallow being toasted on the end of a stick, employs an added dummy cell to represent an external connection to a cell in a different slice that should be connected at this point in the current slice. And the preflet approach adds a structure of cells using one or more special dimensions to represent the latent connection 22,22c, and optionally an elegant way to accomplish a "back.preflet."

While various embodiments have been described above, it should be understood that they have been presented by way of example only, and that the breadth and scope of the invention should not be limited by any of the above described exemplary embodiments, but should instead be defined only in accordance with the following claims and their equivalents.

INDUSTRIAL APPLICABILITY

The present system 10 is well suited for application by people needing to combine datasets and information structures from different sources for either temporary or permanent aggregated use. The invention serves this need by providing a highly usable and efficient solution to combine datasets and information structures by intercalation. Such solutions may be embodied into apparatus, methods, or computer programs, using currently well known and widely used elements and techniques along with the teachings herein.

Embodiments of the inventive system 10 can manipulate datasets and information structures in link-cell structures, as a matter of design choice and selectively, that are able to add detail in virtually any amount; to cope with contradictions among datasets; to depict the consequences of alternative structures; to bring additional detail into stored information; to allow varying structures of connections, as wanted in different contexts; to allow incompatible alternatives to be stored as separate packages of connected cells; to hide information which is deeply connected to other information; and to present and analyze the same data in different sequences and structures by adding new connections and annotations.

Optionally, embodiments of the inventive system 10 can be implemented to be consistent with widely held programming philosophies of what is legitimate, complete and well-connected by itself. This permits such embodiments to advantageously enjoy the benefits that such philosophies are commonly regarded as providing, including easier implementation, fixing, later changing, remembering, and documenting.

For the above, and other, reasons, it is expected that the system 10 of the present invention will have widespread industrial applicability and it is therefore expected that the commercial utility of the present invention will be extensive and long lasting.

What is claimed is:

1. A method for working with data in datasets or information structures, wherein at least some of the data has latent preferences for connection with the data in other datasets or information structures, the method comprising the steps of:
    storing the data for each of the datasets or information structures into a slice of separable cells having actual connections forming independent relational orderings in one or more dimensions;
    examining said cells in each said slice for the latent preferences and identifying said cells having data seeking additional connection as choosing cells and said cells sought to be additionally connected to as target cells;
    adding a latent connection to either said choosing cell or said target cell for each of the latent preferences;
    expressing at least one said slice into said one or more of the conglomerate structures; and
    presenting said at least one said slice in an operator interface, thereby permitting a user to interact with the data in said at least one said slice.

2. The method of claim 1, further comprising expressing multiple said slices by resolving said latent connections therein into said actual connections, thereby combining said multiple said slices into a particular said conglomerate structure.

3. The method of claim 1, further comprising prior to said adding, resolving all contradictions in said actual connections and said latent connections by a process of rules.

4. The method of claim 1, further comprising representing at least one of said actual connections and said latent connections with key-value pairs.

5. The method of claim 1, wherein said latent connections each consist of a half-link.

6. The method of claim 1, wherein said latent connections each comprise an added said cell.

7. The method of claim 1, wherein said latent connections each comprise a preflet including an added said cell along an added said dimension.

8. The method of claim 7, further comprising adding a back-preflet to either of said choosing cells or said target cells in said particular said conglomerate structure, thereby permitting expression of said particular said conglomerate structure back into said multiple said slices.

9. A computer program, embodied on a computer readable storage medium, for working with data in datasets or information structures, wherein at least some of the data has latent preferences for connection with the data in other datasets or information structures, the computer program comprising:
- a code segment that stores the data for each of the datasets or information structures into a slice of separable cells having actual connections forming independent relational orderings in one or more dimensions;
- a code segment that examines said cells in each said slice for the latent preferences and identifies said cells having data seeking additional connection as choosing cells and said cells sought to be additionally connected to as target cells; and
- a code segment that adds a latent connection to either said choosing cell or said target cell for each of the latent preferences, thereby preparing said slices for expression into one or more conglomerate structures.

10. The computer program of claim 9, further comprising a code segment that expresses multiple said slices by resolving said latent connections therein into said actual connections, thereby combining said multiple said slices into a particular said conglomerate structure.

11. The computer program of claim 9, further comprising a code segment that resolves all contradictions in said actual connections and said latent connections by a process of rules.

12. The computer program of claim 9, further comprising a code segment that represents at least one of said actual connections and said latent connections with key-value pairs.

13. The computer program of claim 12, wherein said code segment that represents stores said key-value pairs in a hash table.

14. The computer program of claim 9, wherein said code segment that adds includes a code segment that forms said latent connections to each consist of a half-link.

15. The computer program of claim 9, wherein said code segment that adds includes a code segment that forms said latent connections to each comprise an added said cell.

16. The computer program of claim 9, wherein said latent connections each comprise a preflet including an added said cell along an added said dimension.

17. The computer program of claim 16, further comprising a code segment that adds a back-preflet to either of said choosing cells or said target cells in said particular said conglomerate structure, thereby permitting expression of said particular said conglomerate structure back into said multiple said slices.

18. A system for working with data in datasets or information structures, wherein at least some of the data has latent preferences for connection with the data in other datasets or information structures, the system comprising:
- means for storing the data for each of the datasets or information structures into a slice of separable cells having actual connections forming independent relational orderings in one or more dimensions;
- means for examining said cells in each said slice for the latent preferences and identifying said cells having data seeking additional connection as choosing cells and said cells sought to be additionally connected to as target cells; and
- means for adding a latent connection to either said choosing cell or said target cell for each of the latent preferences, thereby preparing said slices for expression into one or more conglomerate structures.

19. The system of claim 18, further means for expressing multiple said slices by resolving said latent connections therein into said actual connections, thereby combining said multiple said slices into a particular said conglomerate structure.

20. The system of claim 18, further comprising means for resolving all contradictions in said actual connections and said latent connections by a process of rules.

21. The system of claim 18, further comprising means for representing at least one of said actual connections and said latent connections with key-value pairs.

22. The system of claim 21, wherein said means for representing includes means for storing said key-value pairs in a hash table.

23. The system of claim 18, wherein said means for adding includes means for forming said latent connection to consist of a half-link.

24. The system of claim 18, wherein said means for adding includes means for forming said latent connection to comprise an added said cell.

25. The system of claim 18, wherein said latent connections each comprise a preflet including an added said cell along an added said dimension.

26. The system of claim 25, said means for adding includes means for adding a back-preflet to either of said choosing cells or said target cells in said particular said conglomerate structure, thereby permitting expression of said particular said conglomerate structure back into said multiple said slices.

* * * * *